(12) United States Patent
Roland

(10) Patent No.: US 12,533,203 B2
(45) Date of Patent: Jan. 27, 2026

(54) TRAY FOR ASSISTING WITH ENDOVASCULAR SURGERY

(71) Applicant: Lincoln Roland, Pensacola, FL (US)

(72) Inventor: Lincoln Roland, Pensacola, FL (US)

(*) Notice: Subject to any disclaimer, the term of this patent is extended or adjusted under 35 U.S.C. 154(b) by 441 days.

(21) Appl. No.: 18/323,958

(22) Filed: May 25, 2023

(65) Prior Publication Data

US 2023/0380923 A1  Nov. 30, 2023

Related U.S. Application Data

(60) Provisional application No. 63/346,247, filed on May 26, 2022.

(30) Foreign Application Priority Data

Jun. 23, 2022 (GB) .................................. 2209221

(51) Int. Cl.
| | |
|---|---|
| A61B 50/33 | (2016.01) |
| A61B 50/00 | (2016.01) |
| A61B 50/30 | (2016.01) |

(52) U.S. Cl.
CPC .......... *A61B 50/33* (2016.02); *A61B 50/3001* (2016.02); *A61B 2050/005* (2016.02); *A61B 2050/3005* (2016.02); *A61B 2050/3007* (2016.02)

(58) Field of Classification Search
CPC ................ A61B 50/33; A61B 50/3001; A61B 2050/005; A61B 2050/3005; A61B 2050/3007; A61B 50/20; A61B 2050/3006

USPC ....... 206/364, 223, 570, 571, 365, 438, 564; 600/101, 102

See application file for complete search history.

(56) References Cited

U.S. PATENT DOCUMENTS

| | | | |
|---|---|---|---|
| 4,545,783 A * | 10/1985 | Vaughan ................. | A61M 5/14 604/259 |
| 5,611,428 A | 3/1997 | Banerian | |
| 6,569,106 B1 | 5/2003 | Ullman | |
| 7,743,918 B2 * | 6/2010 | Itou ..................... | A61M 25/002 206/364 |
| 9,022,212 B2 * | 5/2015 | Spaargaren ......... | A61M 25/002 206/364 |
| 10,624,614 B2 * | 4/2020 | Tomes .................. | A61B 50/33 |

(Continued)

FOREIGN PATENT DOCUMENTS

| | | | | |
|---|---|---|---|---|
| CN | 115607300 | * | 1/2023 | |
| WO | WO-2013116298 A1 * | | 8/2013 | .......... A61M 25/002 |
| WO | WO-2017028980 A1 * | | 2/2017 | ............. A61B 50/33 |

*Primary Examiner* — Rafael A Ortiz
(74) *Attorney, Agent, or Firm* — Knobbe, Martens, Olson & Bear, LLP

(57) ABSTRACT

A tray used during endovascular surgery includes an upper tray and a lower tray. The upper and lower trays are removably attachable from one another and each includes a first forward side, a second rear side, a third lateral side and a fourth lateral side. The upper tray includes a saline reservoir and the lower tray includes a wire cavity, a wire path and a sponge. The wire path connects the wire cavity with one or more apertures in the first side of the lower tray and the sponge is located within the wire path such that wires can be inserted into any of the one or more apertures, pass through the sponge, along the wire path and into the wire cavity where the wires will coil.

23 Claims, 12 Drawing Sheets

(56) References Cited

U.S. PATENT DOCUMENTS

| | | | |
|---|---|---|---|
| 2003/0159966 A1* | 8/2003 | McMichael | A61B 50/30 206/570 |
| 2004/0004019 A1* | 1/2004 | Busch | A61B 50/30 206/370 |
| 2011/0226766 A1* | 9/2011 | Baker | B65D 1/36 220/23.88 |
| 2014/0110296 A1* | 4/2014 | Terzibashian | B65D 25/108 206/438 |
| 2015/0114864 A1* | 4/2015 | Hartfelder | A61B 34/20 206/370 |
| 2017/0035522 A1 | 2/2017 | Roland | |
| 2017/0354474 A1* | 12/2017 | Dobbyn | A61B 50/30 |
| 2019/0076207 A1* | 3/2019 | Hays | A61B 17/06061 |
| 2021/0353379 A1* | 11/2021 | Hays | A61M 25/09 |
| 2023/0090140 A1* | 3/2023 | Crosby | A61M 25/002 206/364 |

* cited by examiner

TRAY FOR ASSISTING WITH ENDOVASCULAR SURGERY

CROSS-REFERENCE TO RELATED APPLICATIONS

This application claims priority to U.K Application No. 2209221.7 filed on Jun. 23, 2022, which claims the benefit of U.S. Provisional Application No. 63/346,247, filed May 26, 2022, The disclosures of the above-described applications are hereby incorporated by reference in their entirety.

BACKGROUND

Endovascular surgery requires extensive preparation and a large number of items must be present and readily available to the surgeon in order for the surgery to go smoothly.

Endovascular surgery in particular requires a large surface area for surgical instruments as the surgery requires the use of long wires that can be made to travel around the vascular system of the patient.

These wires are reused throughout the surgery and can be prone to tangling. Further, after the first use, the wires can be subject to having dried blood on them, which must be thoroughly cleaned off before re-use to prevent dried blood from entering the bloodstream of the patient. This cleaning can be time-consuming and lead to longer surgery times. Some prior art systems clean the wires by agitating the wires in a saline bath, this does not provide adequate cleaning and improved methods are required.

There is a need for a system that makes it easier and quicker for the surgeon to re-use the wires.

Further, there is a need for a system to reduce the risk of the wires becoming tangled and to prevent the wires from taking up a large amount of space when they are awaiting re-use.

Waste management in endovascular surgery also presents a problem. Waste liquid is often absorbed by towels and then disposed of this creates a large volume of waste. Further during the procedure, the surgeon may not have time to dispose of the towels leading to a build-up of waste materials in the surgery area.

There is a need to reduce the overall waste volume in the surgical process and improve ease of disposal.

After endovascular surgery, a surgeon is required to state how much of various medicines, dyes and liquids (e.g., saline) has been used in the procedure. There is a need in the art for a system that easily allows for the amount of medicine, dyes and liquids used in a surgical procedure to be quantified.

SUMMARY

The present invention in its various aspects is as set out in the appended claims.

The present invention provides a tray to be used during endovascular surgery. The tray comprises an upper tray and a lower tray. The upper and lower tray being removably attachable from one another and each comprising a first forward side, a second rear side, a third lateral side and a fourth lateral side.

The upper tray comprises a saline reservoir and the lower tray comprises a wire cavity, a wire path and a sponge.

The wire path connects the wire cavity with one or more apertures on the first side of the lower tray and the sponge is located within the wire path such that wires can be inserted into any of the one or more apertures, pass through the sponge, along the wire path and into the wire cavity where the wires will coil.

As such, when the wires pass through the sponge, they are cleaned by the sponge. In endovascular surgery, the wires are reused throughout the surgery and cannot have any dried blood on them when reused. The sponge provides means of cleaning the wires as they are put away for storage between uses. Further, the invention provided the benefit of compact storage of wires between uses in the wire cavity. Under normal circumstances the wires will be left uncoiled on a large table, this takes up vital operating theatre space whilst also potentially becoming entangled.

Preferably, the sponge is located under the saline reservoir and the saline reservoir comprises one or more holes in its base, the holes configured to drip saline onto the sponge to keep it moist. This improves the cleaning effectiveness of the sponge. Preferably the number and diameter of the holes are designed such that saline drips through at a rate to keep the sponge moist throughout hours of surgery without oversaturating the sponge and emptying the reservoir prematurely.

The lower tray may comprise a waste cavity. The waste cavity serves as a reservoir for liquid waste such as blood that would otherwise be mopped up/squirted into gauzes and tissues.

The waste cavity, therefore, allows for the overall volume of waste to be reduced and provides hygienic containment of liquid waste during surgery.

The portion of the upper tray that is above the waste cavity when the upper and lower trays are attached may comprise one or more waste holes that provide access to the waste cavity.

This allows for a surgeon to squirt liquid waste into the waste cavity without separating the lower tray. The waste holes preferably comprise a sloped taper over a vertical distance extending below the base of the upper tray such that the waste holes are widest at the base of the upper tray and narrowest at the maximum vertical distance below the base of the upper tray. This prevents splashing and spillage of waste when it is being deposited into the waste cavity through the waste holes. This improves hygiene by reducing the spread of waste and therefore minimising contamination.

The lower tray may additionally comprise a waste cavity lid. The lid may be configured to sit over the waste cavity, between the upper and lower trays when the upper and lower trays are attached. The lid may additionally comprise apertures or notches configured to be positioned, when the lid is in place, directly below the waste holes in the upper tray to allow for waste to be deposited through the waste holes and into the cavity. The lid ensures that the liquid waste is less likely to spill.

The first side of the lower tray may comprise one or more waste cavity apertures. The waste cavity apertures are configured to provide a passage connecting the inside of the waste cavity and the outside of the tray. The waste cavity apertures are preferably of a suitable size to accept a standard catheter tube, preferably with a snug and/or water-tight fit. This allows waste from a catheter to be deposited directly and continuously into the waste cavity. It is further preferable that the waste cavity apertures are positioned towards the top of the first side of the lower tray so as to reduce the chance of backflow of waste along the catheter tube. The top of the first side of the lower tray being the portion of the lower tray that is closest to the upper tray when the two are connected.

The upper tray may comprise a contrast reservoir. This provides a well in which contrast can be stored for use in surgery. Through the provision of the contrast reservoir as part of a larger tray, the present invention reduces the risk of the contrast being spilt. This effect is magnified by the fact that the tray keeps the wires safely coiled as opposed to loose on a table. Loose wires can easily knock over beakers of contrast or other liquid.

The upper tray may comprise a sharps' recess. This provides a safe and secure place in the tray to store sharps, removing the need for them to be placed on a table where they may become contaminated.

The upper tray may comprise an accessories recess. The accessories that could be contained within the recess may include scissors, tape, syringes, etc.

The upper tray may comprise a medicine reservoir. This provides a well in which medicine can be stored for use in surgery. Through the provision of the medicine reservoir as part of a larger tray, the present invention reduces the risk of the medicine being spilt. This effect is magnified by the fact that the tray keeps the wires safely coiled as opposed to loose on a table. Loose wires can easily knock over beakers of medicine or other liquid.

The upper tray may comprise a towel recess. The towel recess provides a place to store gauze and towels prior for use in surgery. Preferably the towel recess is situated at least partially over the waste cavity and any waste holes are in the base of the towel recess. The towel recess is preferably L-shaped and further preferably comprises a raised lip partially separating one arm of the L from another creating two rectangular recessed areas within the towel recess. The lip separates the recess into two areas for different types of towels and also makes it easier for a surgeon to pick off one of the towels.

The upper tray may preferably comprise a contrast reservoir, a sharps recess, an accessories recess, a medicine reservoir and a towel recess.

The saline reservoir and contrast reservoir may preferably each comprise fill level indicators. The fill level indicators may be step level indicators integrally moulded into the reservoirs. The fill indicators allow a surgeon to easily calculate how much of each liquid has been used in the surgery.

The tray may further comprise a removably attachable wire cavity lid; wherein the wire cavity lid is positioned between the upper and lower tray and covers the wire cavity. The wire cavity lid serves to form a continuous boundary over the wire cavity such that the only means of wire ingress or egress is via the wire path. The cavity lid, therefore, ensures the coiling of the wires in the cavity and prevents the wires from escaping when pushed into the cavity.

The upper tray may comprise one or more syringe holding means. Preferably the syringe holding means comprise circular apertures. The syringe holding means provide the benefit that the surgeon or assistant can easily pick up a syringe individually without the possibility of coming into contact with the sharp end of the syringe. If the syringes are not secured, i.e., loose on a table or a tray, when picking up one syringe the sharp end of another syringe may come into contact with one's hand, if it pierces their gloves and skin, this presents a cross-contamination issue and a risk of infection and transmission of disease.

Preferably there are between 4 and 10 syringe holding means. Further preferably there are 7 syringe holding means as this has been found to be the optimum number of syringes required in preparation for endovascular surgery.

Preferably the syringe holding means are suitable for holding different sizes of syringes. For example, if there are 7 syringe holding means, there may be one large holder, four medium holders and two small holders.

The syringe holding means may preferably partially project from the rear side of the upper tray. This keeps the sharps away from the front end where the wires are being managed into the tray.

Further preferably the lower tray comprises sharp sheaths vertically below the syringe holding means. This provides a further safety feature in that the sharp end of the syringes are sheathed when the syringes are being held in the syringe holding means.

The lower tray may comprise a Manifold syringe holder on one or both of the lateral sides. A manifold syringe holder here meaning means for holding a manifold syringe. The manifold syringe holder may be snap fitting, for example, a moulded c shape that the body of a manifold syringe can snap into.

The one or more manifold syringe holders are preferably angled such that a manifold syringe held in the holders would have its needle pointing downwards at an angle between 5 and 45 degrees from the horizontal. This ensures that any air in the manifold syringe will rise to the top of any liquid in the syringe. As a result, a surgeon can take the syringe and use it knowing that they will not inject air into the patient.

The wire cavity, wire path and if present, sharps sheaths and waste cavity are preferably contained within one continuous wall. The continuous wall comprises clips suitable for attaching a catheter such that the catheter may be wrapped around and attached to the continuous wall. This provides a place to hold the catheter in preparation for surgery. The clips for attaching the catheter to the tray are preferably integrally moulded.

Each of the first, second, third and fourth sides are preferably between 30 and 50 cm in length. The depth of the upper and lower trays is preferably between 5 and 8 cm.

The tray may further comprise a removably attachable saline reservoir lid. This serves to prevent the saline from spilling. The saline reservoir lid may comprise an aperture or notch so that a surgeon can access the saline with a syringe when the lid is on. The presence of the lid reduces the chance of contamination of the saline.

The tray may further comprise a removably attachable contrast reservoir lid. This serves to prevent the contrast from spilling. The contrast reservoir lid may comprise an aperture or notch so that a surgeon can access the contrast with a syringe when the lid is on. The presence of the lid reduces the chance of contamination of the contrast.

The saline and contrast lids may preferably be a single lid in the case that the saline and contrast reservoirs are adjacent. The single lid will comprise two notches or apertures for access, one aperture above the saline reservoir and one above the contrast reservoir.

In the case that the notches are present, it is preferable that they are arcuate and disposed in the edge of the lid.

The upper and lower trays preferably attach to one another via one or more integrally moulded clips that provide an interference fit. The upper and lower trays are preferably substantially the same shape.

BRIEF DESCRIPTION OF DRAWINGS

The present invention will now be described in terms of the following figures.

DETAILED DESCRIPTION

Figure 1:
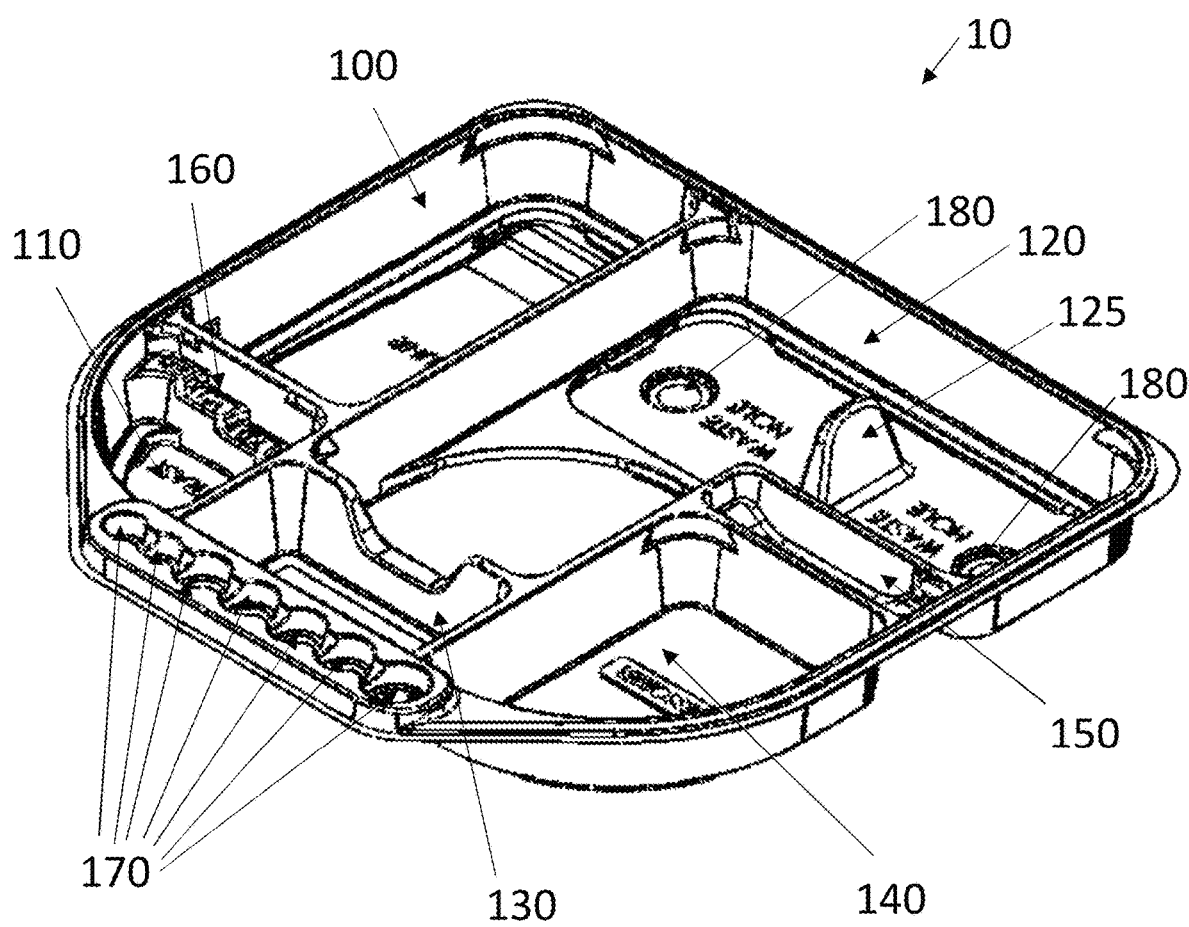
FIG. 1: an isometric view of an upper tray according to the present invention.

The present invention will be described in terms of the following features:

10 upper tray
20 lower tray
100 saline reservoir
105 saline reservoir holes
110 contrast reservoir
120 towel recess
125 lip
130 sharps recess
140 accessories recess
150 medicine reservoir
160 level indicator
170 syringe holding means
180 waste holes
200 continuous wall
210 wire cavity
220 wire path
230 aperture
240 waste cavity
245 waste cavity lid
250 space for a sponge
260 manifold syringe holders
265 brim
270 catheter clips
280 sharps sheath
290 connection means
300 saline and contrast lid
310 saline and contrast lid notches
400 wire cavity lid In the following description, like features will be given like numerals.

FIG. 1 discloses an upper tray 10, the upper tray comprising a saline reservoir 100, contrast reservoir 110, towel recess 120, sharps recess 130, accessories recess 140, medicine reservoir 150, and syringe holding means 170.

The towel recess 120 is L shaped and has a lip 125 positioned within the towel recess such that it is separated into two portions. The base of the towel recess 120 comprises waste holes 180 that correspond with the position of the waste cavity in the lower tray when the upper and lower trays are clipped together (see FIG. 2).

The syringe holding means 170 are positioned on the rear side of the upper tray 10.

Figure 3:
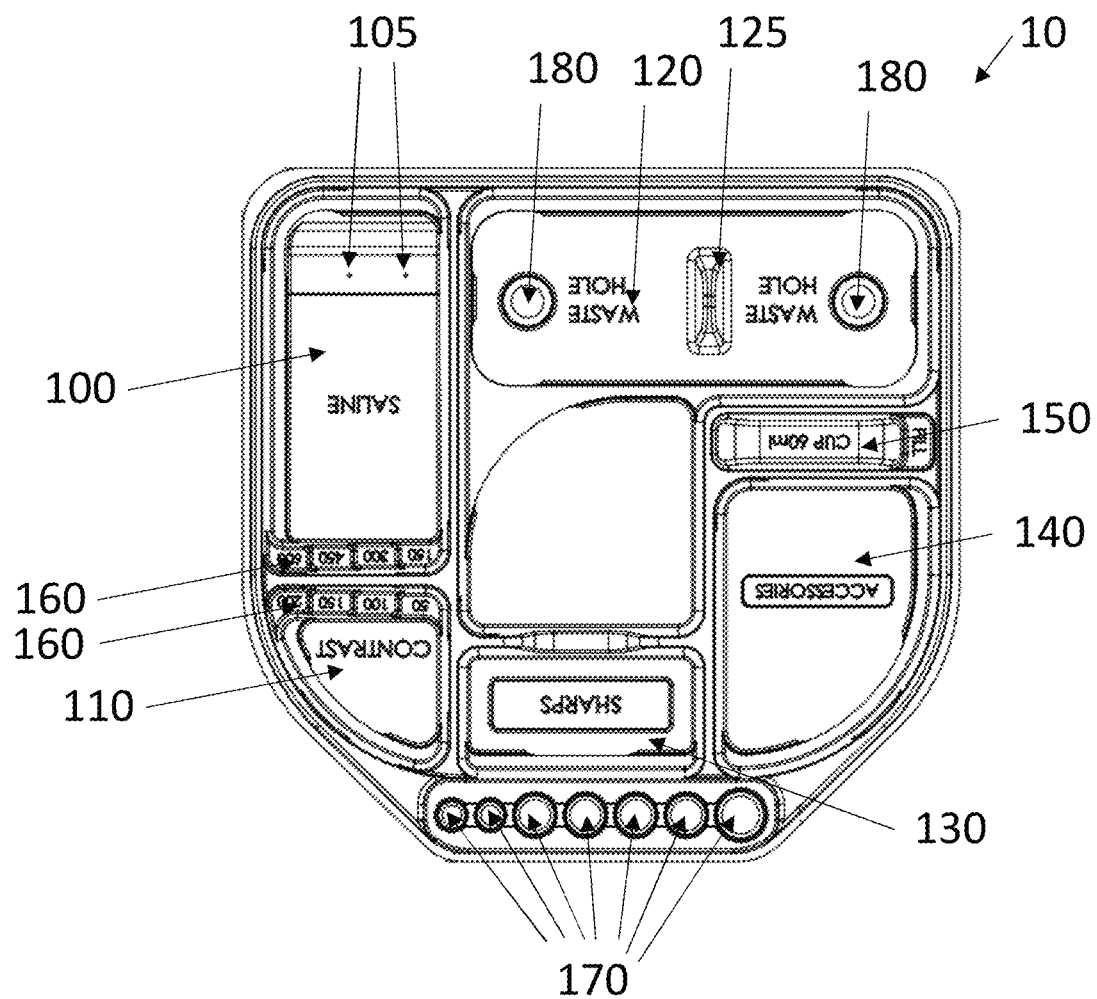
FIG. 3: a plan view of an upper tray according to the present invention.

The saline 100 and contrast 110 reservoirs have level indicators 160 formed by steps. Only the level indicator 160 in the contrast reservoir 110 is visible in FIG. 1. FIG. 3 shows all of the level indicators 160.

The upper tray 10 and lower tray 20 are configured to be connected with the upper tray 10 above the lower tray 20. This is done by means of integrally formed connection means 290 (see FIG. 2) that provide an interference fit.

Figure 2:
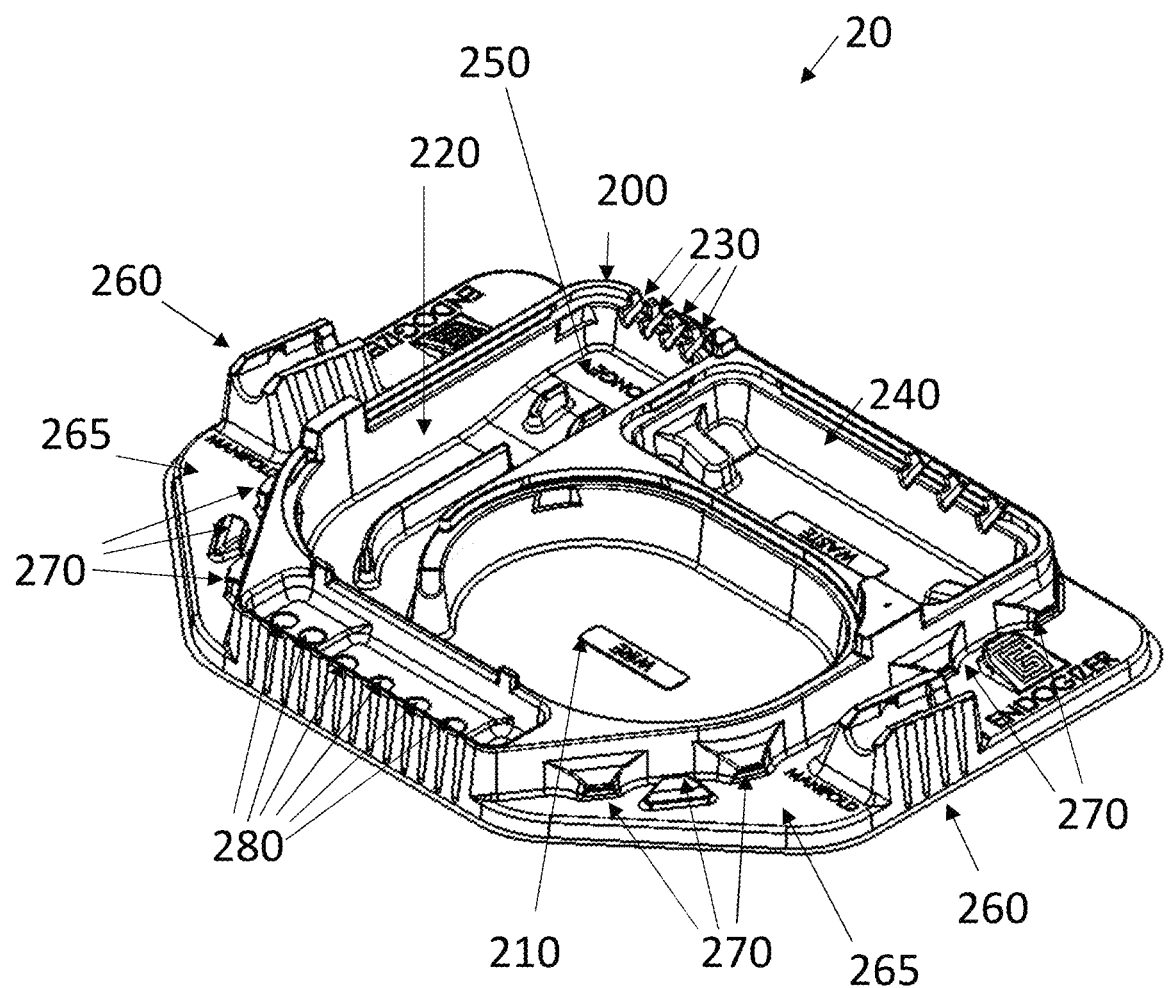
FIG. 2: an isometric view of a lower tray according to the present invention.

FIG. 2 discloses a lower tray 20, the lower tray 20 comprising a wire cavity 210, a wire path 220, apertures 230, a waste cavity 240 and a space for a sponge 250. The wire cavity 210 is disposed in the centre of the lower tray and is connected to the outside of the lower tray 20 by the wire path 220 and apertures 230. As such, a wire may be inserted into one of the apertures 230 and fed along the wire path 220 and into the wire cavity 210. Continuing to feed the wire into the lower tray 20 will then cause the wire to coil in the wire cavity 210 where it is safely contained and ready for use or re-use. The space for the sponge is present in the wire path and abuts the apertures 230. The base of the wire path is moulded in the space for the sponge to provide a recess that will hold the sponge in place as a wire passes through. The sponge itself is not shown in FIG. 2 to allow the apertures and wire path to be more easily viewed.

FIG. 2 also shows two manifold syringe holders 260. Catheter clips 270 and sharps sheaths 280.

The manifold syringe holders 260 are present on the lateral sides of the lower tray 20. They are configured to hold a manifold syringe at an angle to ensure that any air rises to the non-sharp end of a syringe held in the holder 260. The holders 260 are configured to hold a syringe using an interference or push-fit. The holders rise vertically from brims that extend laterally in the plane of the tray beyond a continuous wall that contains the wire cavity 210, wire path 220, waste cavity 240, space for a sponge 250 and sharps sheaths 280. The apertures 230 being disposed in said continuous wall 200. The continuous wall 200 has connection means 290 formed thereon for the purpose of attaching the upper tray 10 to the lower tray 20. The brims 265 with the manifold syringe holders 260 extend beyond the region that is covered by the upper tray 10 when the two trays are attached. This provides unrestricted access to the manifold syringes.

Catheter clips 270 are disposed on the continuous wall 200 and brims 265. The catheter clips 270 allow a catheter to wrap around the continuous wall and be secured in place.

The sharps sheaths 280 are situated such that they will be underneath the syringe holding means 170 of the upper tray 10 when the two trays are attached.

FIG. 3 shows the upper tray 10 of FIG. 1 in plan view. From this view, the level indicators 160 are visible in both the saline 100 and contrast 110 reservoirs. Also, the two saline reservoir holes 105 present in the bottom of the saline reservoir 100 are visible. These serve to drip saline onto the sponge held in the lower tray.

Figure 4:
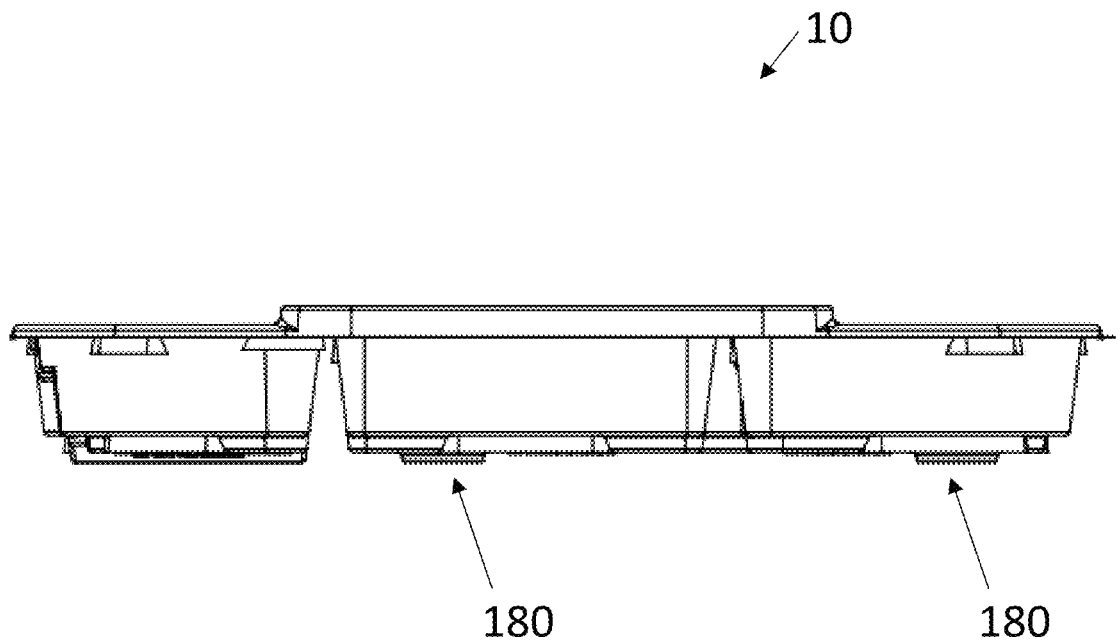
FIG. 4: a side view of an upper tray according to the present invention.

FIG. 4 shows the upper tray 10 of FIG. 1 in a side-on view, looking from the rear side, at the syringe holding means 170.

Figure 5:
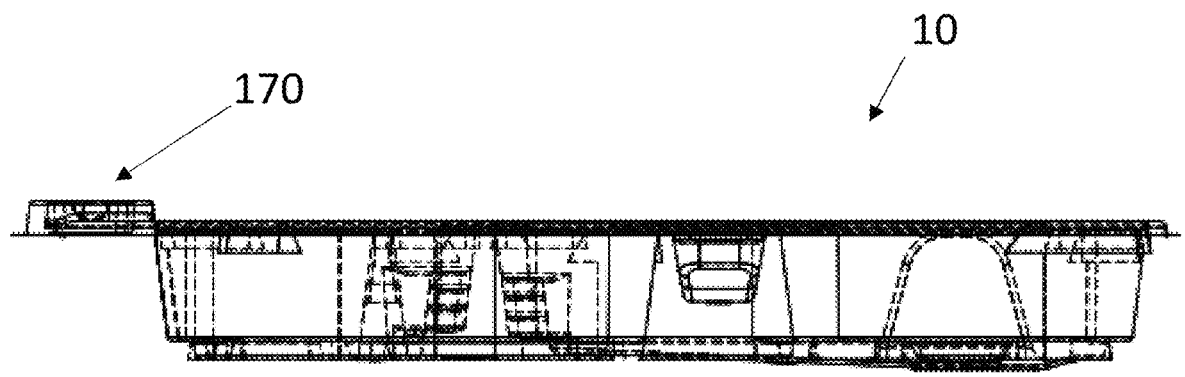
FIG. 5: a side view of an upper tray according to the present invention.

FIG. 5 shows an alternative side-on view to the upper tray 10, looking this time from one of the lateral sides.

The syringe holding means 170 are here seen protecting away from the main body of the upper tray. The taper of the waste holes 180 can be seen as the waste holes 180 taper as they extend away from the base of the towel recess 120.

Figure 6:
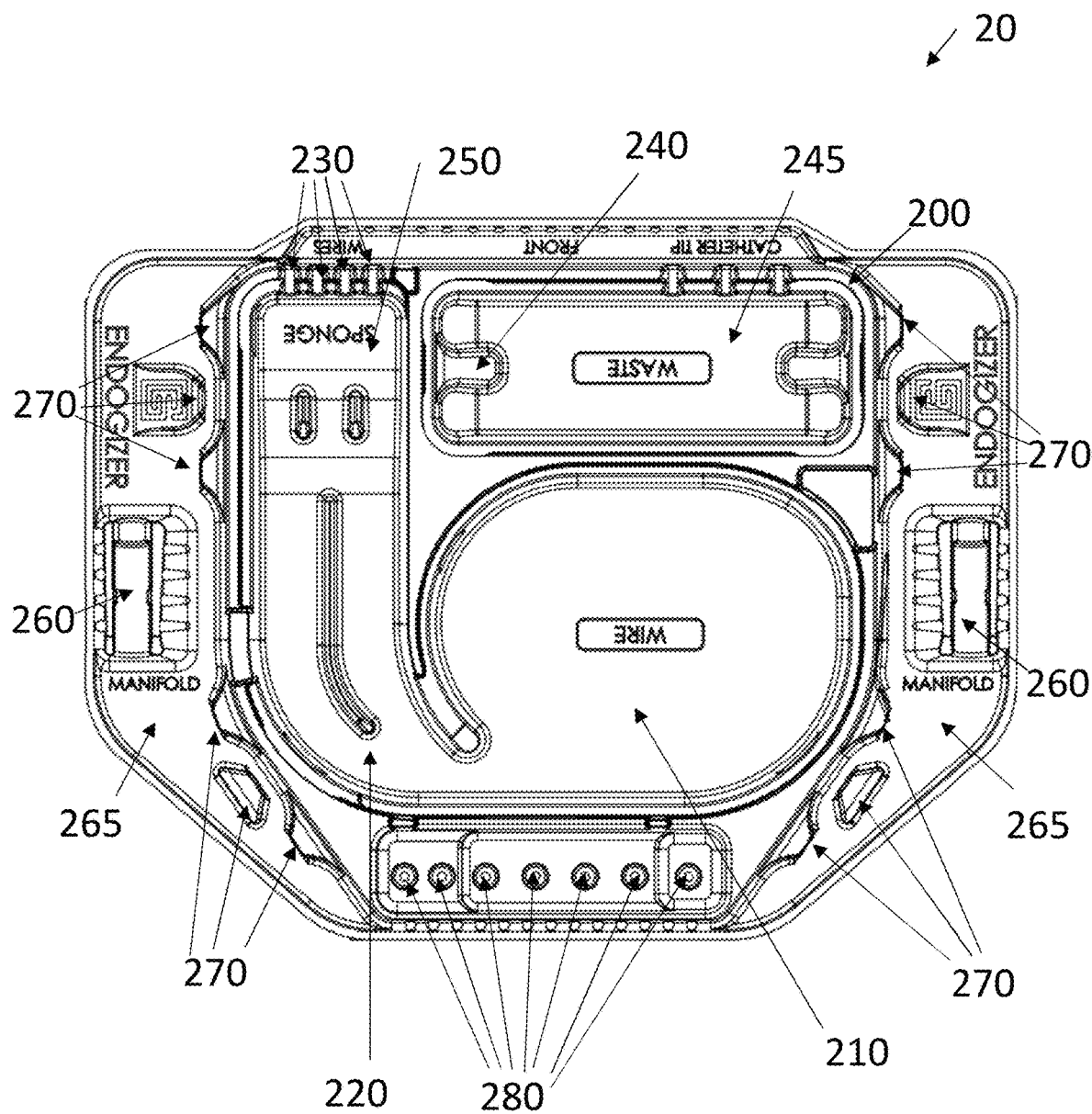
FIG. 6: a plan view of a lower tray according to the present invention.

FIG. 6 shows the lower tray 20 of FIG. 2 in a plan view. In this figure, a waste cavity lid 245 is shown. The lid may be configured to sit over the waste cavity, between the upper and lower trays when the upper and lower trays are attached. The lid comprises two notches configured to be positioned, when the lid is in place, directly below the waste holes in the upper tray to allow for waste to be deposited through the waste holes and into the cavity.

Figure 7:
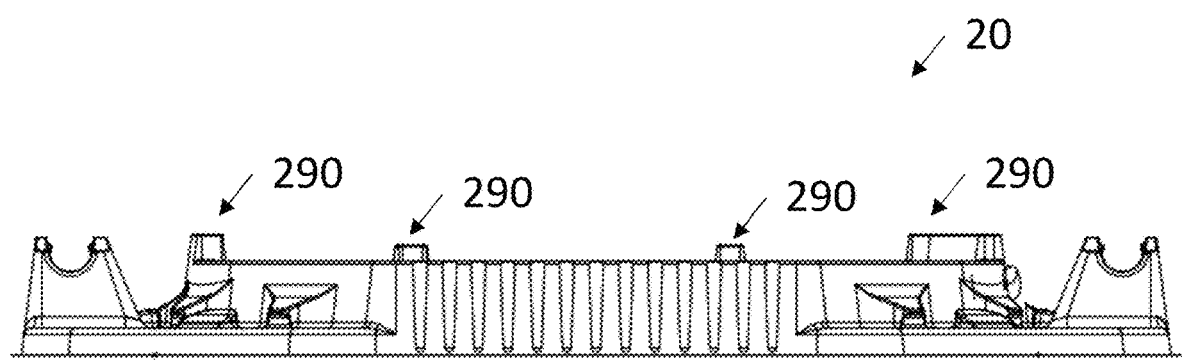
FIG. 7: a side view of a lower tray according to the present invention.

The lid ensures that the liquid waste is less likely to spill FIG. 7 shows the lower tray in a side-on view looking from the direction of the sharps sheaths 280. From this angle, the protection of the connection means 290 from the continuous wall 200 is clearly seen. These projections may be received by moulded indentations in the base of the upper tray 10 so as to secure the two trays 10 20 together by means of interference fit.

Figure 8:
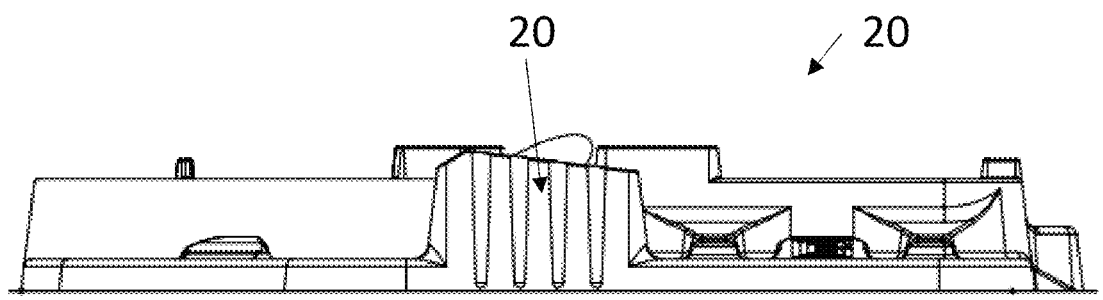
FIG. 8: a side view of a lower according to the present invention.

FIG. 8 shows an alternative side-on view to the upper tray 10, looking this time from one of the lateral sides. From this view, the angle of the manifold syringe holders 260 is clearly shown.

Figure 9:
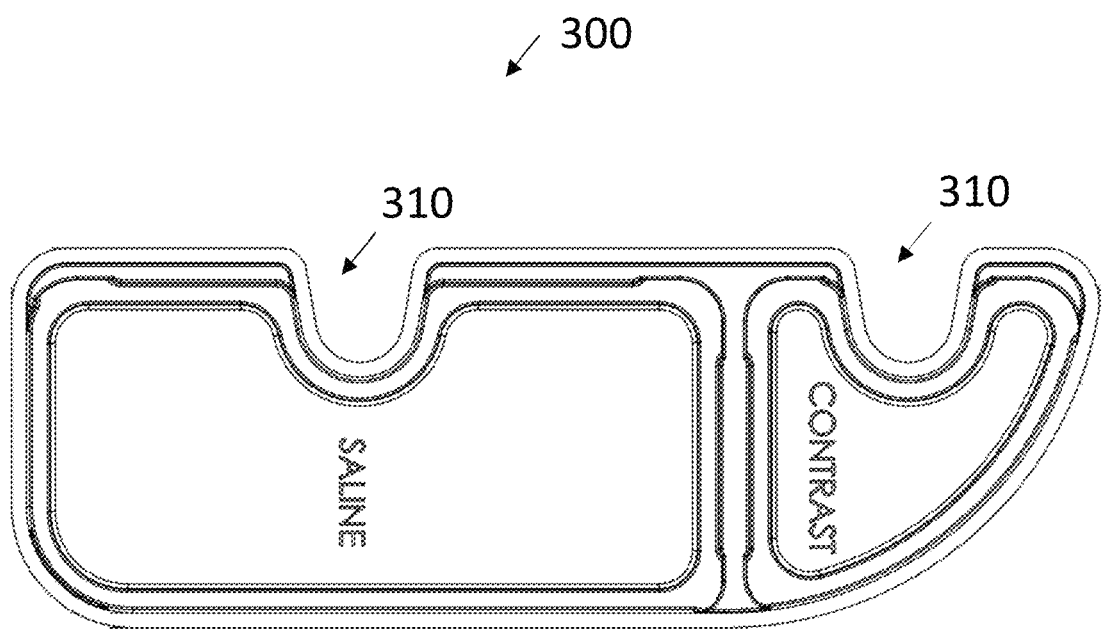
FIG. 9: a plan view of a lid according to the present invention.

FIG. 9 shows a saline and contrast lid 300. Comparing the shape of the lid 300 to the shape of the saline and contrast reservoirs in FIGS. 1 and 3, it can be seen that the lid covers both reservoirs simultaneously. The lid comprises two arcuate notches 310 that allow access to the saline and contrast by means of a syringe when the lid is in situ.

Figure 10:
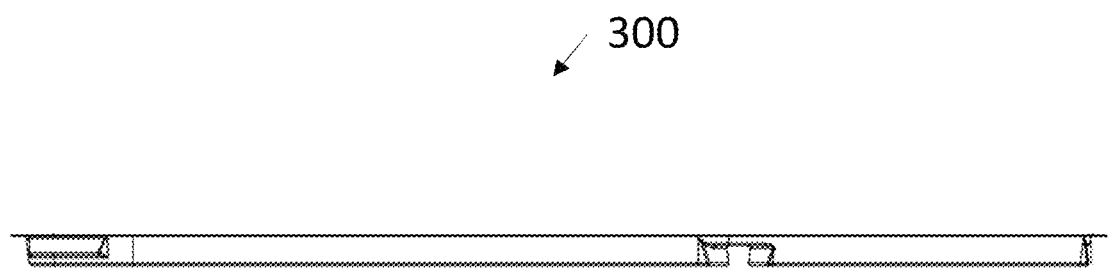
FIG. 10: a side view of a lid according to the present invention.

FIG. 10 shows the lid of FIG. 9 in a side-on view. As can be seen, there is an indentation between the portion of the lid that would cover the contrast and the portion of the lid that covers the saline. The boundary between the two reservoirs will occupy this indentation when the lid is in place. This prevents the transfer of liquid between the contrast and saline reservoir in the event, for example, that the tray is knocked.

Figure 11:
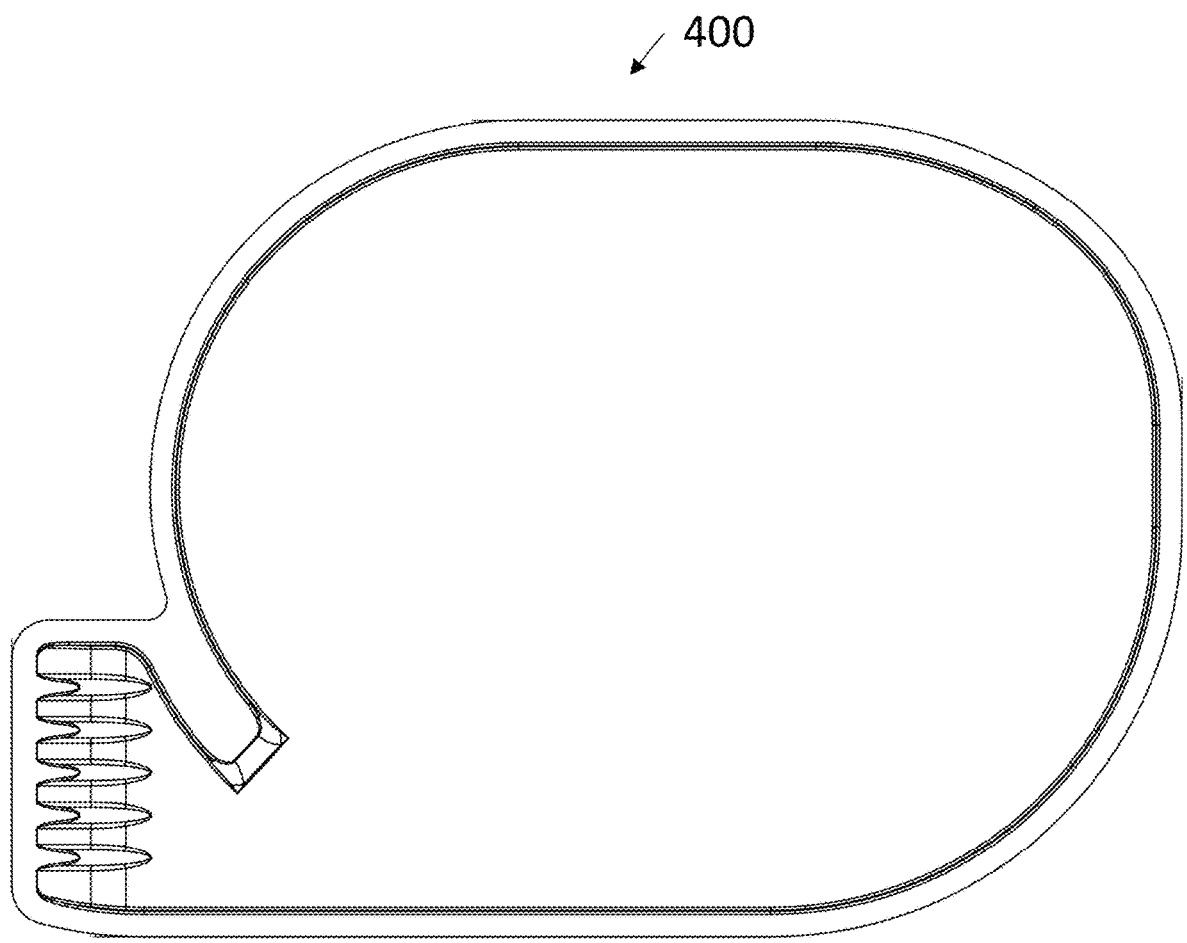
FIG. 11: a plan view of a lid according to the present invention.
Figure 12:
FIG. 12: a side view of a lid according to the present invention.

FIG. 11 shows a wire cavity Lid 400. The wire cavity lid 400 is configured to be positioned between the upper 10 and lower tray 20 and covers the wire cavity 210. The wire cavity lid serves to form a continuous boundary over the wire cavity 210 such that the only means of wire ingress or egress is via the wire path. The wire cavity lid 400, therefore, ensures the coiling of the wires in the cavity and prevents the wires from escaping when pushed into the cavity.

What is claimed is:

1. A tray to be used during endovascular surgery comprising an upper tray and a lower tray; the upper and lower tray removably attachable from one another and each comprising a first forward side, a second rear side, a third lateral side and a fourth lateral side;
    the upper tray comprising: a saline reservoir,
    the lower tray comprising: a wire cavity, a wire path and a sponge;
    wherein the wire path connects the wire cavity with one or more apertures in the first side of the lower tray and the sponge is located within the wire path such that wires can be inserted into any of the one or more apertures, pass through the sponge, along the wire path and into the wire cavity where the wires will coil.

2. The tray of claim 1 wherein the sponge is located under the saline reservoir and the saline reservoir comprises one or more holes in its base, the holes configured to drip saline onto the sponge to keep it moist.

3. The tray of claim 1 wherein the lower tray comprises a waste cavity.

4. The tray of claim 3 wherein the portion of the upper tray that is above the waste cavity when the upper and lower trays are attached comprises one or more waste holes that provide access to the waste cavity.

5. The tray according to claim 4 wherein the waste holes comprise a sloped taper over a vertical distance extending below the base of the upper tray such that the waste holes are widest at the base of the upper tray and narrowest at the maximum vertical distance below the base of the upper tray.

6. The tray of claim 1 wherein the upper tray further comprises a contrast reservoir, a sharps recess, an accessories recess, a medicine reservoir and a towel recess.

7. The tray of claim 6 wherein the saline reservoir, contrast reservoir and medicine reservoir each comprise fill level indicators.

8. The tray of claim 1 further comprising a removably attachable wire cavity lid, wherein the wire cavity lid is positioned between the upper and lower tray and covering the wire cavity.

9. The tray of claim 1 wherein the upper tray comprises syringe holding means.

10. The tray of claim 9 wherein the syringe holding means comprise circular apertures.

11. The tray of claim 9 wherein the syringe holding means partially project from the rear side of the upper tray.

12. The tray of claim 9 wherein the lower tray comprises sharp sheaths vertically below the syringe holding means.

13. The tray of claim 1 wherein the lower tray comprises a manifold syringe holder on one or both of the lateral sides.

14. The tray of claim 13 wherein the one or more manifold syringe holders are angled such that a manifold syringe held in the holders would have its needle pointing downwards at an angle between 5 and 45 degrees from horizontal.

15. The tray of claim 1 wherein the wire cavity, wire path and, optionally, sharps sheaths and waste cavity are contained within one continuous wall; and, the continuous wall comprises integrally moulded clips suitable for attaching a catheter such that the catheter may be wrapped around and attached to the continuous wall.

16. The tray of claim 1 wherein the each of the first, second third and $4^{th}$ sides are between 30 and 50 cm in length.

17. The tray of claim 1 wherein the depth of the upper and lower trays is between 5 and 8 cm.

18. The tray of claim 1 wherein the tray further comprises a removably attachable saline reservoir lid.

19. The tray of claim 6 wherein the tray further comprises a removably attachable contrast reservoir lid.

20. The tray of claim 18 wherein the lid or lids comprise an aperture.

21. The tray of claim 1 wherein the upper and lower trays attach to one another via one or more integrally molded clips that provide an interference fit.

22. The tray of claim 1 wherein the upper and lower trays are substantially the same shape.

23. The tray of claim 6 wherein the towel recess is L-shaped and a raised lip partially separated one arm of the L from another creating two rectangular recessed areas within the towel recess.

* * * * *